United States Patent
McNamara et al.

(10) Patent No.: US 11,760,453 B1
(45) Date of Patent: Sep. 19, 2023

(54) DEEP-OCEAN POLYMETALLIC NODULE COLLECTOR

(71) Applicants: Roger P. McNamara, Highlands Ranch, CO (US); Charles Rash, Aurora, CO (US); Richard J. McNamara, Tampa, FL (US); Stephen Rash, Aurora, CO (US)

(72) Inventors: Roger P. McNamara, Highlands Ranch, CO (US); Charles Rash, Aurora, CO (US); Richard J. McNamara, Tampa, FL (US); Stephen Rash, Aurora, CO (US)

( * ) Notice: Subject to any disclaimer, the term of this patent is extended or adjusted under 35 U.S.C. 154(b) by 0 days.

(21) Appl. No.: 18/177,538

(22) Filed: Mar. 2, 2023

Related U.S. Application Data

(60) Provisional application No. 63/316,294, filed on Mar. 3, 2022.

(51) Int. Cl.
*B63G 8/00* (2006.01)
*B63G 8/04* (2006.01)
(Continued)

(52) U.S. Cl.
CPC ............... *B63G 8/001* (2013.01); *B63G 8/04* (2013.01); *B63G 8/08* (2013.01); *B63G 8/14* (2013.01);
(Continued)

(58) Field of Classification Search
CPC . B63G 8/001; B63G 8/04; B63G 8/08; B63G 8/14; B63G 2008/002; B65G 15/00; E02F 3/78
(Continued)

(56) References Cited

U.S. PATENT DOCUMENTS

| | | | | |
|---|---|---|---|---|
| 3,731,975 A | * | 5/1973 | Lindelof | E02F 5/006 299/8 |
| 4,231,171 A | | 11/1980 | Balligand et al. | |

(Continued)

FOREIGN PATENT DOCUMENTS

| | | | | |
|---|---|---|---|---|
| AU | 2011267843 A1 | * | 12/2012 | E02F 3/20 |
| CN | 106194191 A | | 7/2016 | |

(Continued)

*Primary Examiner* — Anthony D Wiest

(57) ABSTRACT

A deep-ocean polymetallic nodule collector is an apparatus that is used to harvest polymetallic nodules and other natural resources from the ocean floor. To do so, the apparatus includes a support frame and a collection mechanism. The support frame is a durable structure designed to withstand the harsh deep-ocean conditions. The support frame keeps the collection mechanism adjacent to the ocean floor for the mining of polymetallic nodules without damage to the underwater ecosystem. In addition, the support frame allows for attachment of mining support vehicles that support the operation of the apparatus. The mining support vehicles can include, but are not limited to, cabled vehicles which are connected to the surface for power, monitoring, and control, wireless submersible vehicles, or ocean-bottom based vehicles that can operate autonomously, semi-autonomously, or by remote control. The collection mechanism enables the collection of polymetallic nodules while minimizing the damage to the underwater ecosystem.

20 Claims, 18 Drawing Sheets

(51) Int. Cl.
  *B63G 8/08* (2006.01)
  *B65G 15/00* (2006.01)
  *B63G 8/14* (2006.01)

(52) U.S. Cl.
  CPC ........ B65G 15/00 (2013.01); *B63G 2008/002* (2013.01)

(58) Field of Classification Search
  USPC ................................................ 299/9; 37/307
  See application file for complete search history.

(56) References Cited

U.S. PATENT DOCUMENTS

| | | | |
|---|---|---|---|
| 4,232,903 | A | 11/1980 | Welling et al. |
| 4,343,098 | A | 8/1982 | Balligand et al. |
| 4,357,764 | A | 11/1982 | Lemercier et al. |
| 4,685,742 | A | 8/1987 | Moreau |
| 4,872,977 | A | 10/1989 | Jackson |
| 5,328,250 | A | 7/1994 | Upright |
| 6,003,952 | A * | 12/1999 | Smart ..................... E02F 5/006 37/324 |
| 2013/0306524 | A1 | 11/2013 | Welch |
| 2020/0165795 | A1 | 5/2020 | Chang et al. |

FOREIGN PATENT DOCUMENTS

| | | |
|---|---|---|
| CN | 112282761 A | 1/2021 |
| CN | 112963151 A | 6/2021 |
| GB | 2486014 A | 6/2012 |
| JP | 11117658 A2 | 4/1999 |

\* cited by examiner

US 11,760,453 B1

DEEP-OCEAN POLYMETALLIC NODULE COLLECTOR

FIELD OF THE INVENTION

The present invention relates to underwater mining systems. More specifically, the present invention is an underwater collection apparatus designed to facilitate the collection of polymetallic nodules from the ocean floor.

BACKGROUND OF THE INVENTION

The need for mining and collecting natural resources has been a necessity for centuries due to technological progress in many industries. To accommodate the increased demand for natural resources, different systems have been developed to mine natural resources from different environments. These systems must be adapted to operate under the different environmental conditions of the location of the mining operation. For example, collecting underwater polymetallic nodules can pose specific problems due to the harsh conditions of the ocean floor. While various systems for underwater polymetallic nodules collection have been made available, most of these systems cause harm on the underwater ecosystem to a certain extent. There is a need for a system that allows for the collection of polymetallic nodules and other natural resources from the ocean floor without major damage to the underwater ecosystems.

An objective of the present invention is to provide a deep-ocean polymetallic nodule collector for harvesting underwater polymetallic nodules without significant damage to the underwater ecosystem. The present invention is designed to minimize harm done to the underwater ecosystem by limiting the physical contact necessary to collect the polymetallic nodules from the ocean floor. Another objective of the present invention is to provide a deep-ocean polymetallic nodule collector with enhanced mobility and flexibility to navigate the ocean floor. The present invention is designed to better navigate the ocean floor to minimize damage that can be done to the underwater ecosystem while collecting the polymetallic nodules. Additional features and benefits of the present invention are further discussed in the sections below.

SUMMARY OF THE INVENTION

The present invention is a deep-ocean polymetallic nodule collector. The deep-ocean polymetallic nodule collector harvests polymetallic nodules located at extreme ocean depths without destroying the pristine local environment, including the organisms living around and in the sediment near the nodules. The present invention does not produce clouds of drifting sediment that negatively impacts all living organisms, over large areas, extending from the ocean floor to the ocean surface.

DETAIL DESCRIPTIONS OF THE INVENTION

Figure 1:
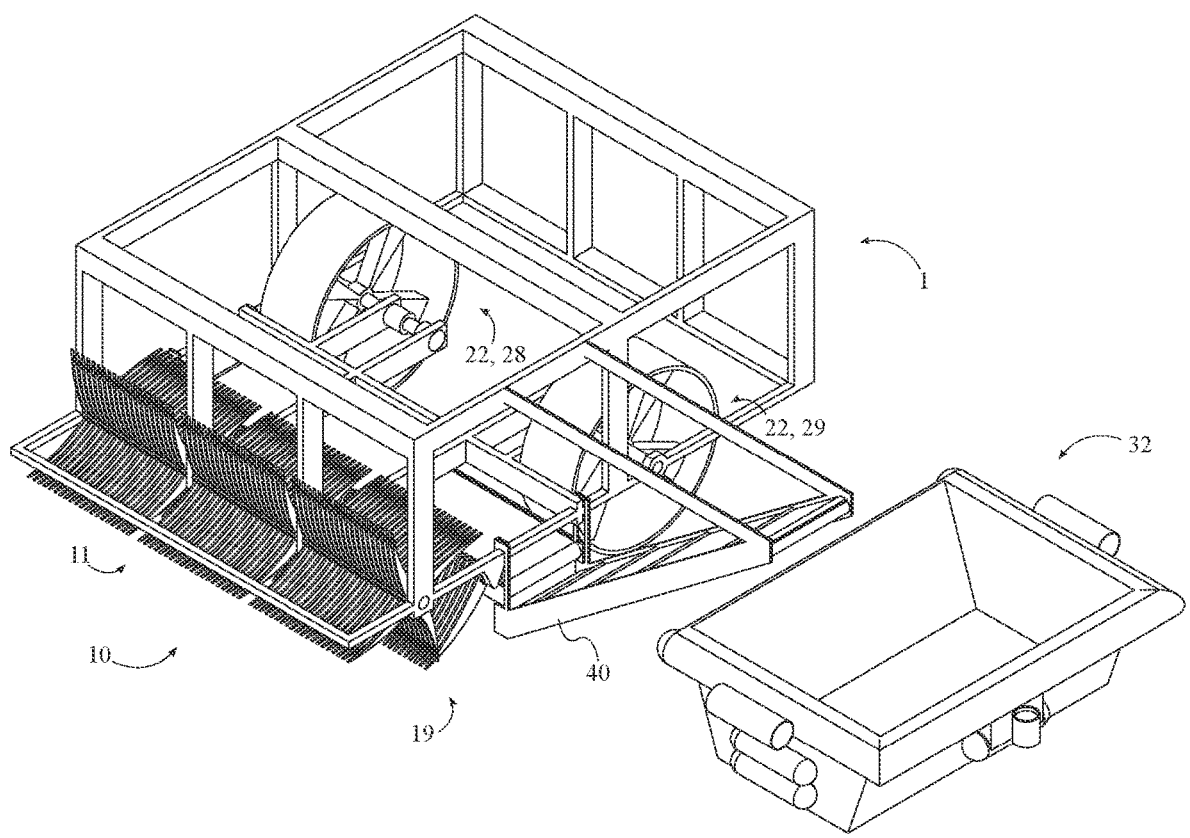
FIG. 1 is a top front perspective view of the present invention.
Figure 2:
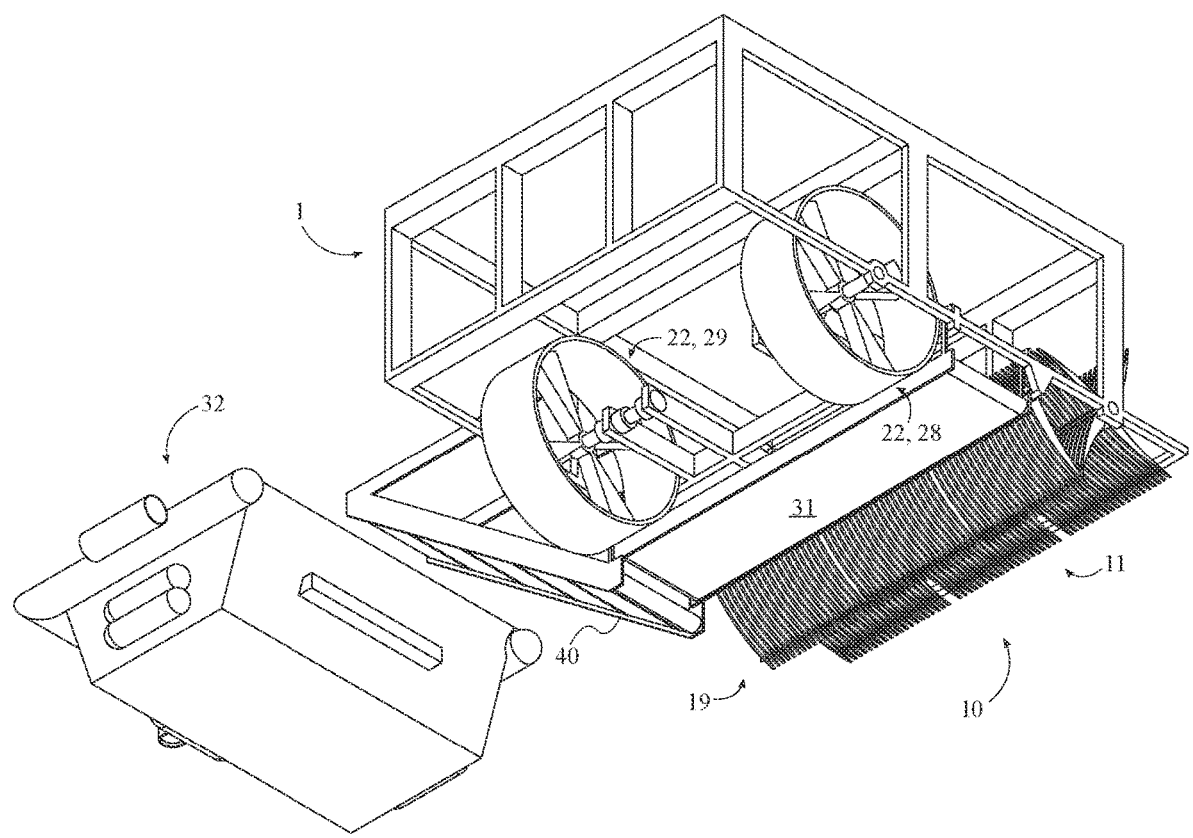
FIG. 2 is a bottom rear perspective view of the present invention.
Figure 3:
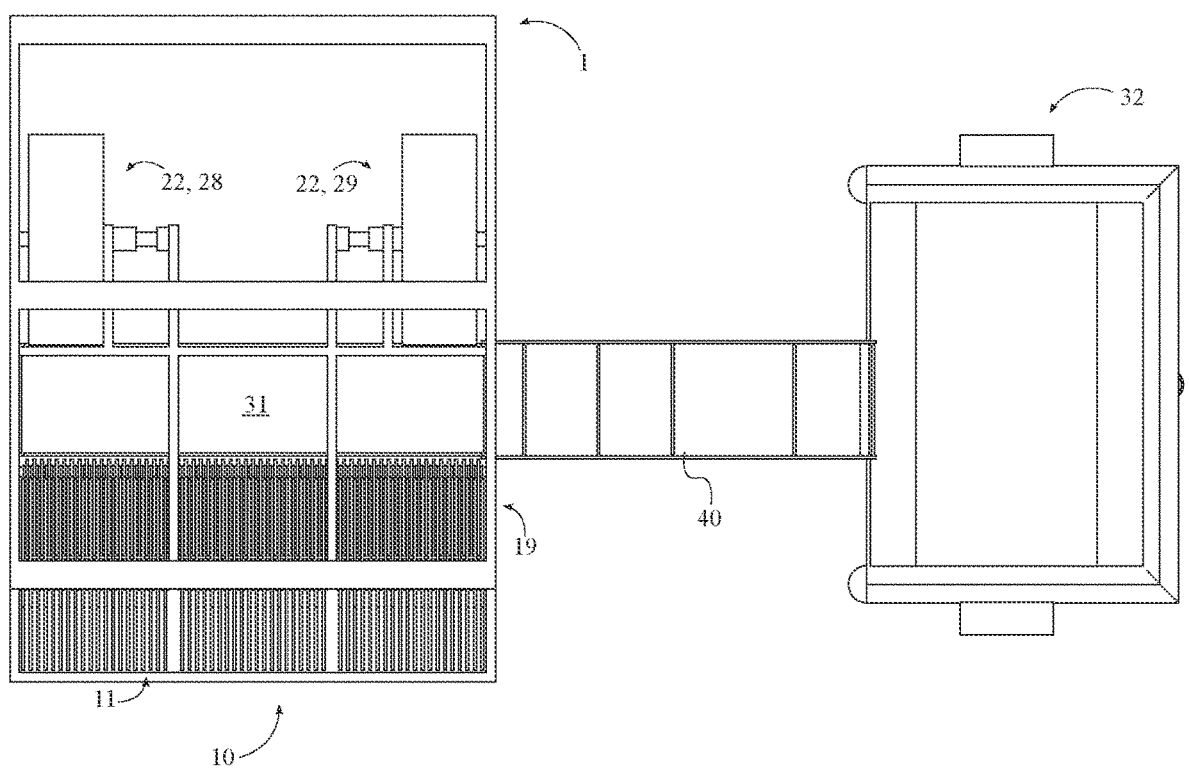
FIG. 3 is a top view of the present invention.
Figure 4:
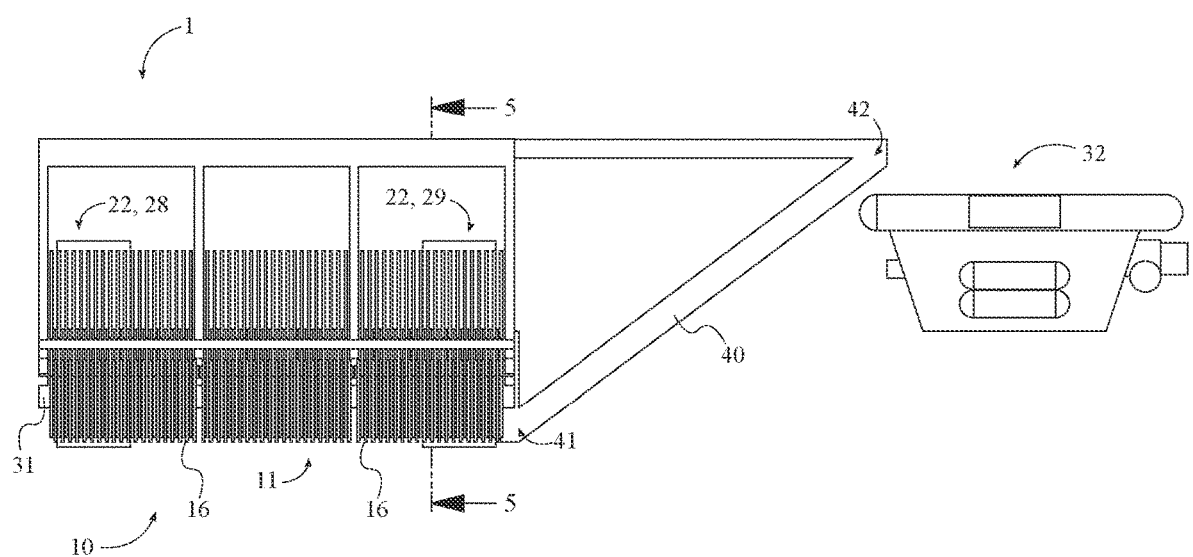
FIG. 4 is a front view of the present invention.
Figure 5:
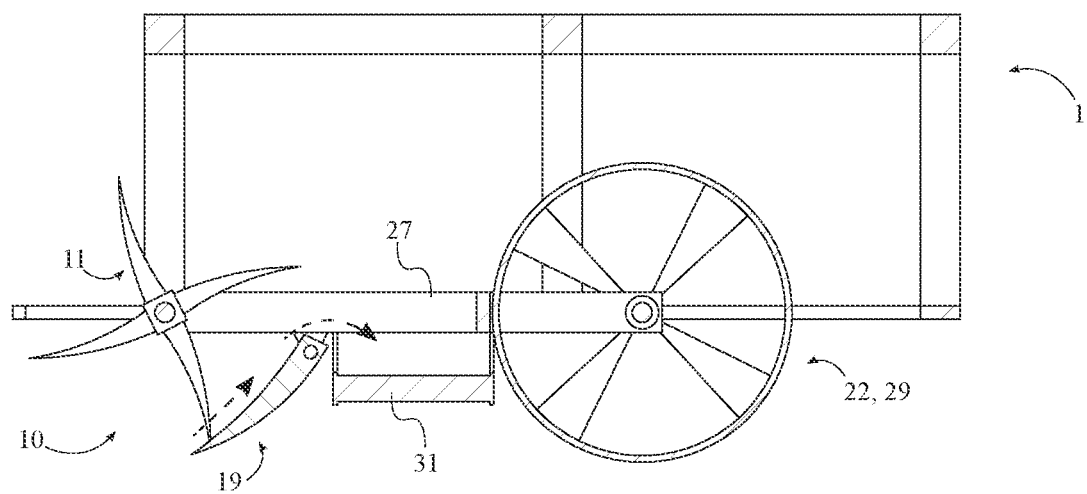
FIG. 5 is a vertical cross-sectional view of the present invention taken in the direction of line 5-5 in FIG. 4.
Figure 6:
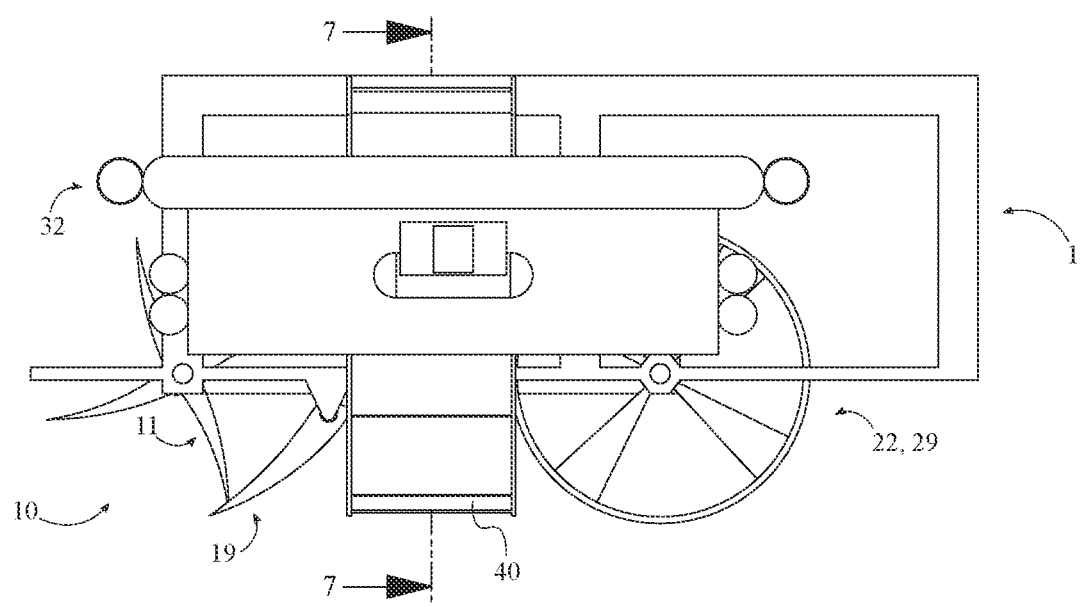
FIG. 6 is a side view of the present invention.
Figure 7:
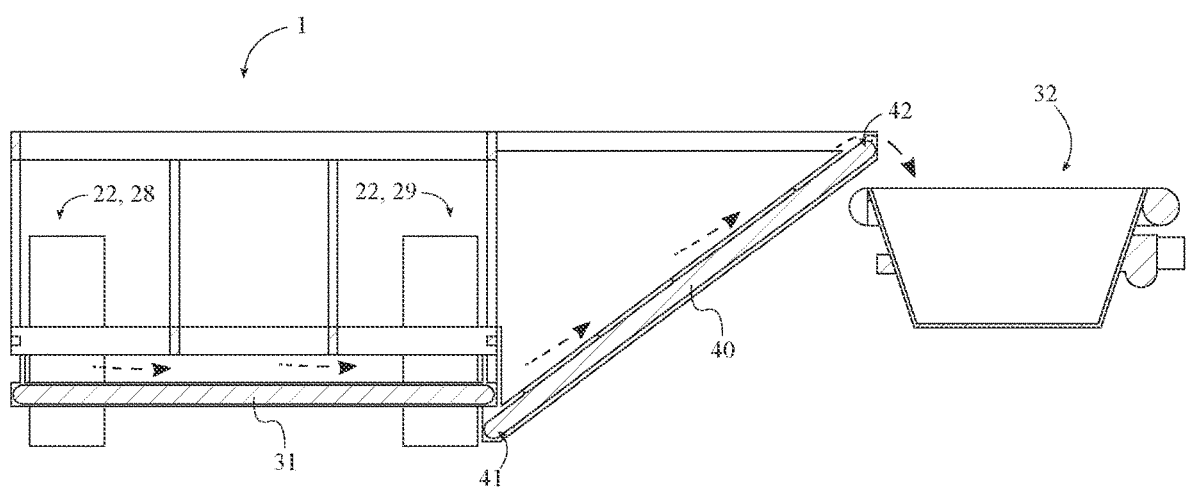
FIG. 7 is a vertical cross-sectional view of the present invention taken in the direction of line 7-7 in FIG. 6.
Figure 8:
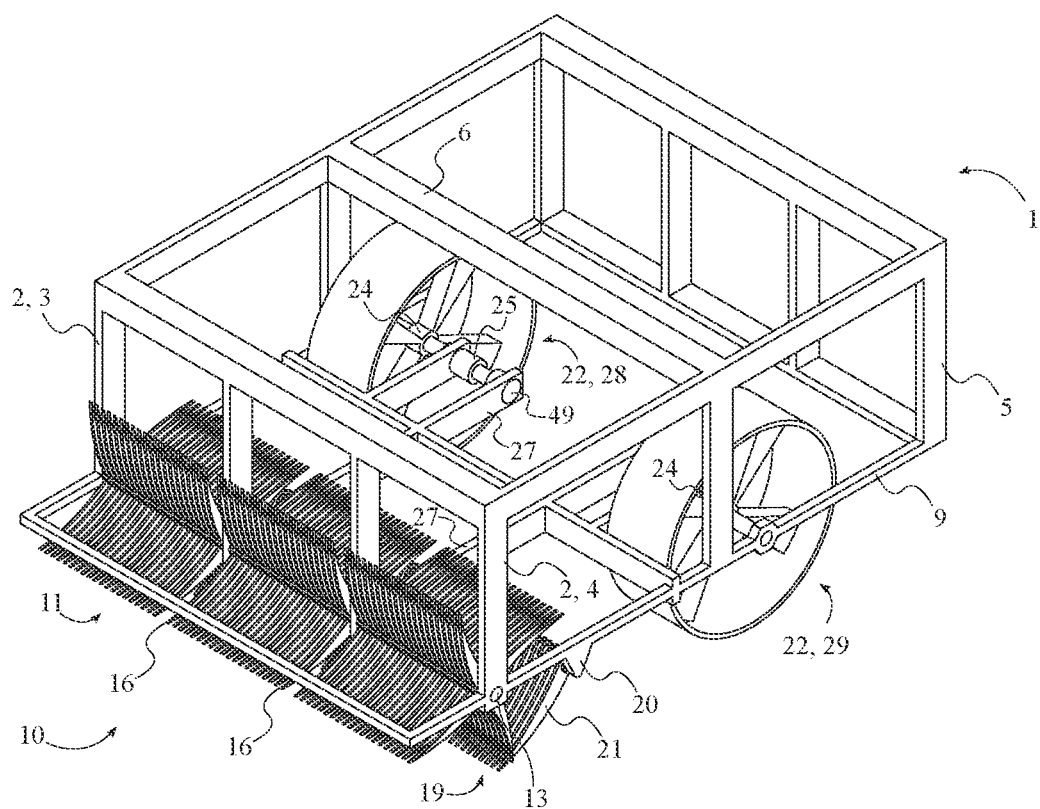
FIG. 8 is a top front perspective view of the present invention, wherein the present invention is shown without a motorized conveyor belt, wherein the present invention is shown without a motorized extension conveyor belt, and wherein the present invention is shown without a collection bin.
Figure 9:
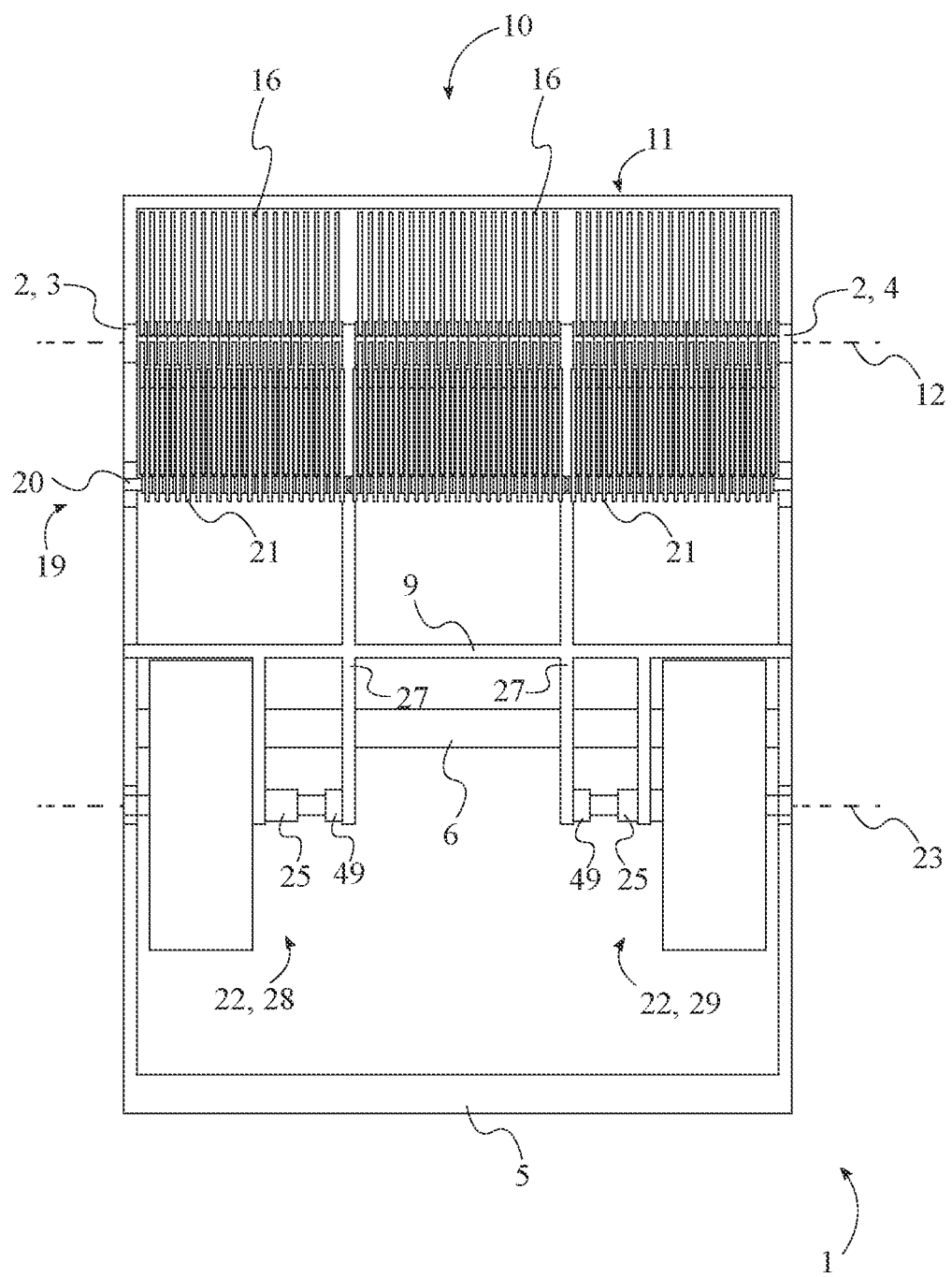
FIG. 9 is a bottom view of the present invention.

All illustrations of the drawings are for the purpose of describing selected versions of the present invention and are not intended to limit the scope of the present invention.

The present invention is a deep-ocean polymetallic nodule collector that is used to harvest polymetallic nodules and other natural resources found on the ocean floor. As can be seen in FIG. 1 through 10 and 13, the present invention comprises a support frame 1 and a collection mechanism 10. The support frame 1 is a durable structure designed to withstand the deep-water conditions while enabling the operation of the collection mechanism 10. The support frame 1 allows for attachment of mining support vehicles to the present invention. The mining support vehicles include, but are not limited to, cabled vehicles (vehicles connected to the surface for power, monitoring, and control), wireless submersible vehicles, or ocean-bottom based vehicles such as deep ocean rovers that can operate autonomously, semi autonomously, or by remote control. The collection mechanism 10 enables the collection of polymetallic nodules while minimizing the damage to the underwater ecosystem.

The general configuration of the aforementioned components enables for the mining of natural resources from the ocean floor without harming the underwater ecosystem. As can be seen in FIG. 1 through 10, 13, 16, and 17, the support frame 1 supports the operation of the collection mechanism 10 while enabling the attachment of the present invention to a support vehicle. To do so, the support frame 1 comprises a proximal frame section 2, a distal frame section 5, an upper base 6, and a lower base 9. The support frame 1 is a truss structure with an overall rectangular shape. The proximal frame section 2, the distal frame section 5, the upper base 6, and the lower base 9 correspond to the lateral sides of the support frame 1. Further, the collection mechanism comprises a raking unit 11, a collection ramp 19, at least one wheel 22, a control unit 26, and at least one motor 49. The raking unit 11 corresponds to the mechanism that safely removes the polymetallic nodules from the ocean floor without causing major damage to the ecosystem. The collection ramp 19 facilitates the collection of the removed polymetallic nodules from the raking unit 11. The at least one wheel 22 facilitates the movement of the support frame 1 along the ocean floor. The at least one wheel 22 also facilitates the operation of the raking unit 11 as the support frame 1 is moved along the ocean floor by a support vehicle. The control unit 26 enables the direct or remote operation of the at least one motor 49. The at least one motor 49 facilitates the rotation of the raking unit 11 to mine the natural resources from the ocean floor. Power, telemetry, and control signals can be transmitted from the support vehicle to the at least one motor via the control unit 26. The control unit 26 can also include various electronics for system monitoring and control, sensors, telemetry, communications, and power distribution.

In the preferred embodiment, the present invention can be assembled as follows. As can be seen in FIG. 1 through 10, 13, 16, and 17, the proximal frame section 2 and the distal frame section 5 are positioned parallel and opposite to each other across the support frame 1 due to the overall rectangular shape of the support frame 1. Similarly, the upper base 6 and the lower base 9 are positioned parallel and opposite to each other across the support frame 1 due to the overall rectangular shape of the support frame 1. Further, the raking unit 11 is positioned adjacent to the proximal frame section 2 so that the raking unit 11 is positioned towards the area where the polymetallic nodules are located. Further, a rake rotation axis 12 of the raking unit 11 is positioned parallel to the proximal frame section 2 so that the rotation of the raking unit 11 follows the direction along which the support frame 1 is moving. The raking unit 11 is rotationally mounted onto the lower base 9 to secure the raking unit 11 to the support frame 1 while enabling the rotation of the raking unit 11. Further, the collection ramp 19 is positioned adjacent to the raking unit 11 to collect the polymetallic nodules removed from the ocean floor. The collection ramp 19 is also mounted onto the lower base 9 to secure the collection ramp 19 to the support frame 1 while positioning the collection ramp 19 in the way of the removed polymetallic nodules. Further, the at least one wheel 22 is positioned offset to the raking unit to not obstruct with the mining of the natural resources. The at least one wheel 22 is also rotatably mounted onto the lower base to facilitate the movement of the support frame 1 along the ocean floor with the aid of a support vehicle. Further, the control unit can be integrated onto the support frame 1 to enable the transmission of control signals and power from the support vehicle to the at least one motor 49. In general, the at least one motor 49 is operatively coupled to the raking unit 11. In other words, the at least one motor 49 is used to rotate the raking unit 11 to enable the mining of the natural resources without damaging the ecosystem of the ocean floor. For example, a rotor of the at least one motor 49 hermetically integrated into the support frame 1 can be connected to the raking unit 11 via a connection system that enables the transfer of torque generated by the at least one motor 49 to the raking unit 11.

Furthermore, the at least one motor 49 is electronically connected to the control unit 26 to receive operational signals from the support vehicle. The at least one motor 49 is also electrically connected to the control unit to receive the voltage necessary for the operation of the at least one wheel 22. In other embodiments, the present invention may include integrated control and power sources for direct control of the present invention.

In some embodiments, to help stabilize the support frame 1 along the ocean floor, the upper base 6 may comprise several pressurized beams. The pressurized beams are used to increase the buoyancy of the support frame 1. To do so, the pressurized beams are integrated into various sections of the upper base 6 in order to create a desire level of buoyancy of the support frame 1 such that the raking unit 11 can effectively mine the desired natural resources from the ocean floor. In other embodiments, additional pressurized beams can be integrated in other sections of the support frame 1. Further, different buoyancy mechanisms can be utilized to modify the buoyancy of the overall present invention.

As can be seen in FIG. 1 through 12, the raking unit 11 is designed to minimize the damage to the ocean ecosystem while removing the polymetallic nodules from the ocean floor. To do so, the raking unit 11 may comprise a unit axle 13 and a plurality of raking disks 16. The plurality of raking disks 16 includes several raking disks that remove the polymetallic nodules from the ocean floor. The unit axle 13 supports the rotation of the plurality of raking disks 16 while securing the plurality of raking disks 16 to the support frame 1. Further, the proximal frame section 2 may comprise a first lateral beam 3 and a second lateral beam 4 corresponding to two lateral beams that shape the proximal frame section 2. In addition, the unit axle 13 may comprise a first axle end 14 and a second axle end 15 corresponding to the terminal ends of the unit axle 13. To assemble the raking unit 11, the first lateral beam 3 and the second lateral beam 4 are positioned parallel and opposite to each other across the support frame 1 due to the rectangular shape of the proximal frame section 2. Further, the first axle end 14 is rotatably connected to the first lateral beam 3 so that the first axle end 14 can rotate on the first lateral beam 3. Similarly, the second axle end 15 is rotatably connected to the second lateral beam 4 so that the second axle end 15 can rotate on the second lateral beam 4. Furthermore, the plurality of raking disks 16 is distributed along the unit axle 13 so that the unit axle 13 is mostly covered by raking disks. The plurality of raking disks 16 is distributed along the unit axle 13 in such a way that a sufficiently large gap in between adjacent raking disks is formed. This way, small objects or animals can pass through the raking unit 11 without harm. The plurality of raking disks 16 is also mounted onto the unit axle 13 to secure each raking disk to the unit axle 13. This way, when the support vehicle moves the support frame 1 forward, the plurality of raking disks 16 rotate against the ocean floor. Further, the at least one motor 49 further rotate the plurality of raking disks 16 to facilitate the collection of the desired natural resources from the ocean floor. The unit axle 13 keeps all the plurality of raking disks 16 rotating together, which keeps the present invention moving in the desired direction and increases the efficiency of collecting polymetallic nodules.

In the preferred embodiment, each of the plurality of raking disks 16 includes several blades that enable the removal of the polymetallic nodules from the ocean floor to be collected by the collection ramp 19. As can be seen in FIG. 1 through 12, each of the plurality of raking disks 16 may comprise a disk hub 17 and a plurality of raking blades 18. The disk hub 17 secures the plurality of raking blades 18 to the unit axle 13. The plurality of raking blades 18 includes several curved blades with a sharp end that help remove the polymetallic nodules from the ocean floor. The disk hub 17 is axially aligned with the unit axle 13 so that the rotation of the plurality of raking blades 18 matches the rotation of the unit axle 13. Further, the disk hub 17 is mounted onto the unit axle 13 to secure the disk hub 17 to the unit axle 13. The plurality of raking blades 18 is radially distributed about the disk hub 17 so that a different raking blade is in contact with the ocean floor as the corresponding raking disk is rotated. Furthermore, each of the plurality of raking blades 18 is terminally connected to the disk hub 17 to secure the plurality of raking blades 18 to the unit axle 13. In addition, this leaves an end of each raking blade free to comb through the silt the ocean floor to move the adjacent polymetallic nodule towards the collection ramp 19. However, each raking blade is oriented with the convex edge oriented towards the collection ramp 19 so that each raking blade does not unnecessarily damage the ocean ecosystem. In other embodiments, the plurality of raking disks 16 can be shape or oriented differently to mine different natural resources without damaging the ocean ecosystem.

As can be seen in FIG. 1 through 12, to accommodate the design of the raking unit 11, the collection ramp 19 is also designed to not harm the ocean ecosystem while collecting all the polymetallic nodules moved by the raking unit 11. To do so, the collection ramp 19 may comprise a ramp crossbar 20 and a plurality of ramp blades 21. The ramp crossbar 20 corresponds to an elongated bar that secures the plurality of ramp blades 21 to the support frame 1. The plurality of ramp blades 21 includes several blades oriented vertically to guide the collected polymetallic nodules towards a storage structure or the attached support vehicle. Accordingly, the ramp crossbar 20 is positioned parallel and offset to the unit axle 13 so that the collected polymetallic nodules rise evenly along the plurality of ramp blades 21. The ramp crossbar 20 is also mounted onto the lower base 9 to secure the ramp crossbar 20 to the support frame 1. Further, the plurality of ramp blades 21 is distributed along the ramp crossbar 20 to match the distribution of the plurality of raking disks 16 on the unit axle 13. The plurality of ramp blades 21 is distributed along the ramp crossbar 20 in such a way that a sufficiently large gap in between adjacent ramp blades is formed. In addition, the plurality of raking disks 16 is positioned to pass between the gaps of the plurality ramp blades to minimize disruption of sea life living in the silt on the ocean floor. The collection ramp 19 slides just below the surface of the silt to collect nodule. This way, small objects or animals can pass through the collection ramp 19 without harm. The plurality of ramp blades 21 is also oriented towards the plurality of raking disks 16 so that the polymetallic nodules moved by the raking unit 11 are forced to move up the plurality of ramp blades 21. In addition, each of the plurality of ramp blades 21 is terminally connected to the ramp crossbar 20 to secure the plurality of ramp blades 21 to the ramp crossbar 20.

As can be seen in FIG. 1 through 10, 16, and 17, the operation of the at least one motor 49 drives the operation of the raking unit 11. To do so, the present invention may further comprise a drive assembly 27. The drive assembly 27 enables the transmission of the torque generated by the at least one motor 49 to be transferred to the unit axle 13 so that the unit axle 13 rotates the plurality of raking disks 16. Accordingly, the at least one motor 49 is positioned adjacent to the proximal frame section 2 to maintain the at least one motor 49 close to the unit axle 13. Further, the at least one motor 49 and the drive assembly 27 are integrated into the lower base 9 in such a way that both the at least one motor 49 and the drive assembly 27 are protected. For example, the drive assembly 27 can be housed within an assembly housing to prevent silt clogging. Furthermore, the unit axle 13 is torsionally connected to the at least one motor 49 by the drive assembly 27. This way, when the at least one motor 49 is engaged by the control unit 26, the at least one motor 49 generates torque that rotates the unit axle 13 via the drive assembly 27. In other embodiments, different drive systems can be utilized to rotate the unit axle using a motor.

As can be seen in FIG. 1 through 10 and 17, the at least one wheel 22 preferably rotates as the support frame 1 is being moved by the support vehicle. However, in some embodiments, the at least one wheel 22 may include separate means to generate torque that independently drives the at least one wheel 22 separate or along with the support vehicle. To enable the rotation of the at least one wheel 22 when the support vehicle propels the support frame 1, the at least one wheel 22 may comprise a wheel hub 24 and a wheel motor 25. The wheel hub 24 connects the at least one wheel 22 to the wheel motor 25. The wheel motor 25 drives the rotation of the at least one wheel 22. Accordingly, the wheel hub 24 and the wheel motor 25 are mounted onto the lower base 9 to secure the wheel hub 24 and the wheel motor 25 to the support frame 1. A wheel rotation axis 23 of the wheel hub 24 is positioned parallel to the rake rotation axis 12 to align the rotation of the at least one wheel 22 to the rotation of the raking unit 11. Further, the wheel hub 24 is torsionally connected to the wheel motor 25 so that the wheel motor 25 can drive the rotation of the at least one wheel 22 separate from the rotation of the unit axle 13. Furthermore, the wheel motor 25 is electronically connected to the control unit 26 to receive operational signals from the support vehicle. The wheel motor 25 is also electrically connected to the control unit 26 to receive the voltage necessary for the operation of the wheel motor 25. In other embodiments, the unit axle 13 may also be torsionally connected to the wheel motor 25 by the drive assembly 27 so that the wheel motor 25 drives the rotation of the at least one wheel 22 and the unit axle 13 simultaneously.

As can be seen in FIG. 1 through 10 and 17, the at least one wheel 22 keeps the plurality of raking disks 16 at an optimum distance above the ocean floor to limit the depth the plurality of raking blades 18 penetrate the silt. This approach greatly limits disruption of organisms living in and above the ocean bottom near the nodules. This approach also minimizes or eliminates the generation of environmentally damaging sediment clouds that are produced by the current, more aggressive forms of nodule mining machinery. Further, the present invention can include several wheels depending on the operational requirements of the present invention. So, in some embodiments, the at least one wheel 22 may be a first wheel 28 and a second wheel 29. The first wheel 28 and the second wheel 29 can provide greater support to the movement of the support frame 1 and the collection mechanism 10 along the ocean floor. To do so, the first wheel 28 and the second wheel 29 are positioned opposite to each other across the support frame 1. In addition, the wheel hub 24 of the first wheel 28 is axially aligned with the wheel hub 24 of the second wheel 29 so that the rotation of both wheels is aligned with each other. In other embodiments, the present invention can include several motorized wheels to augment the thrust provided by the support vehicle.

Figure 10:
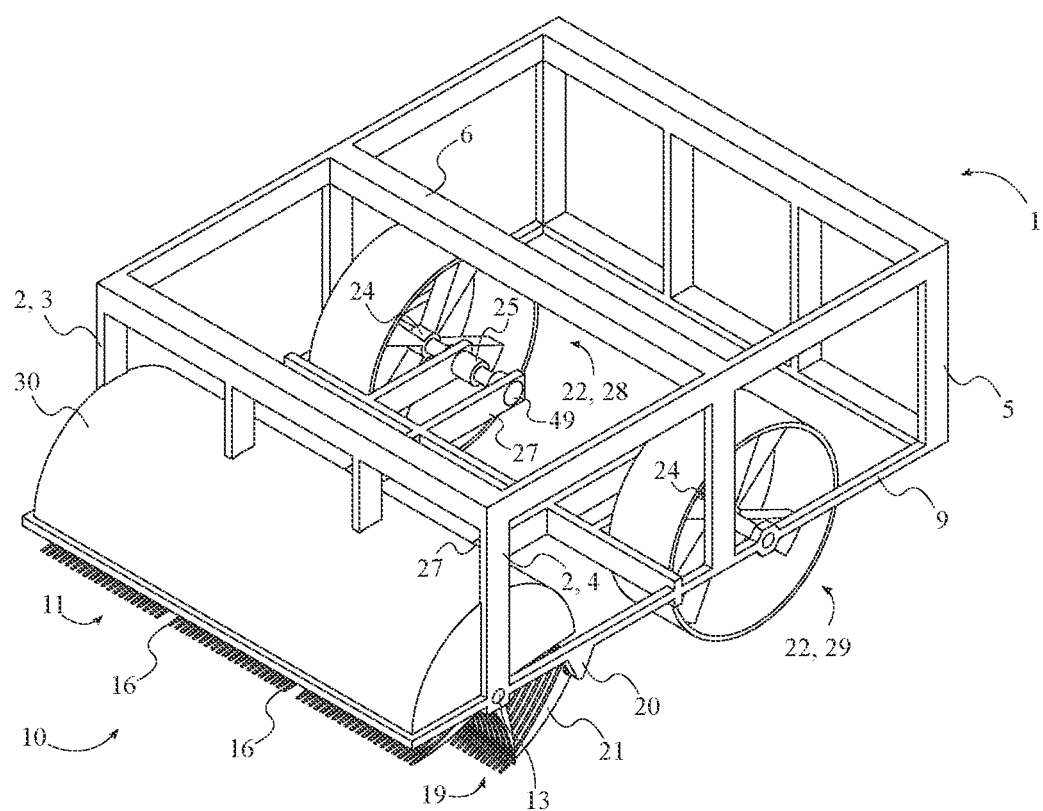
FIG. 10 is a top front perspective view of the present invention, wherein the present invention is shown with a rake cover.
Figure 11:
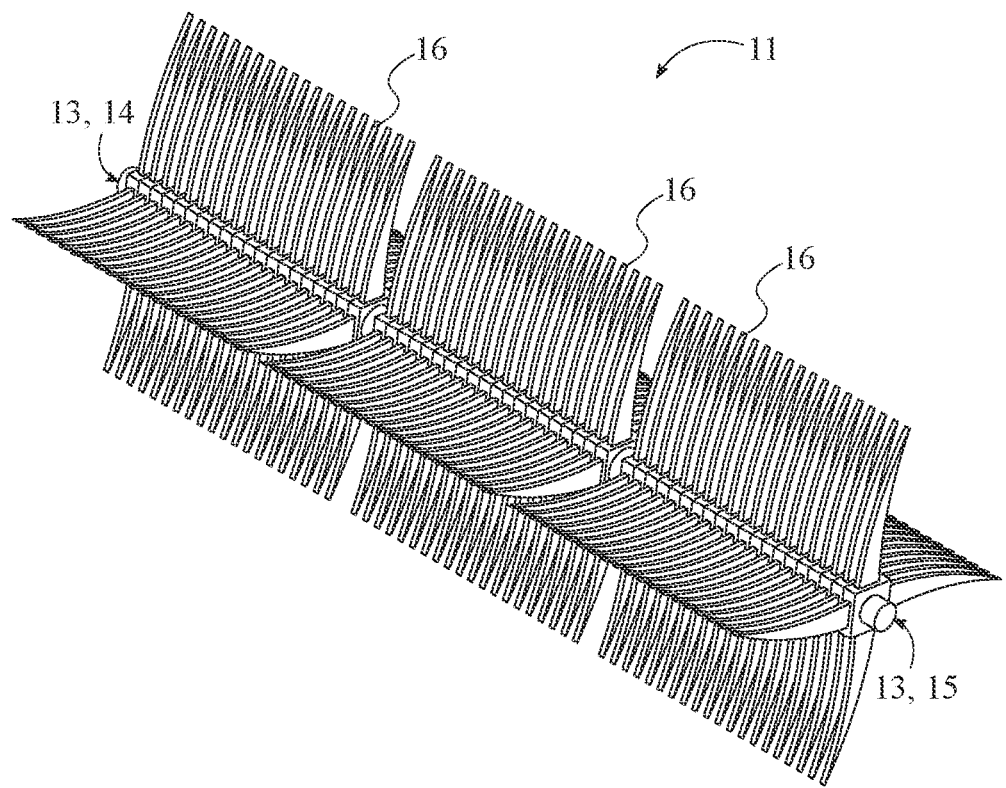
FIG. 11 is a top front perspective view of the raking unit of the present invention.
Figure 12:
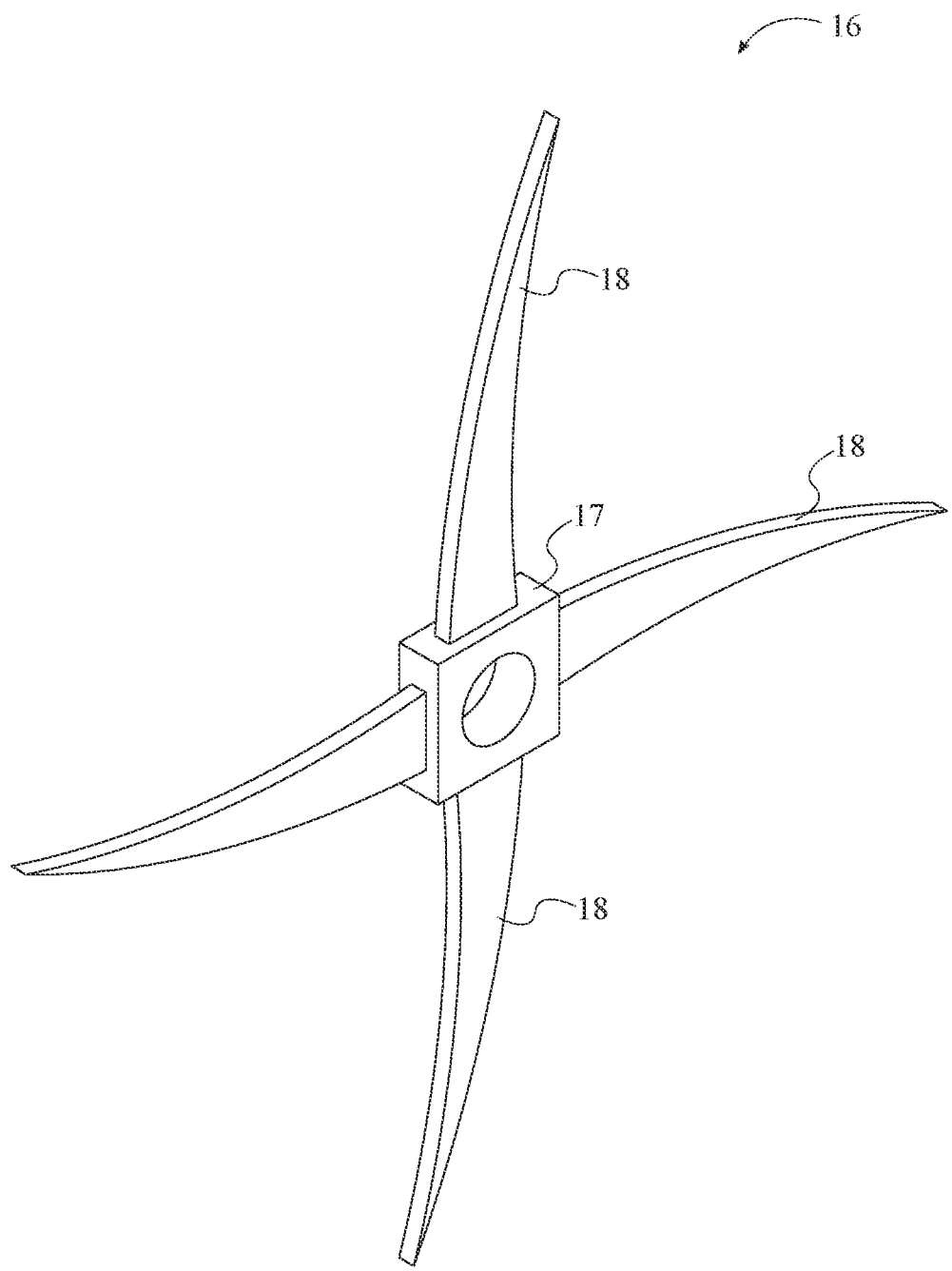
FIG. 12 is a top front perspective view of a raking blade of the plurality of raking blades of the present invention.
Figure 13:
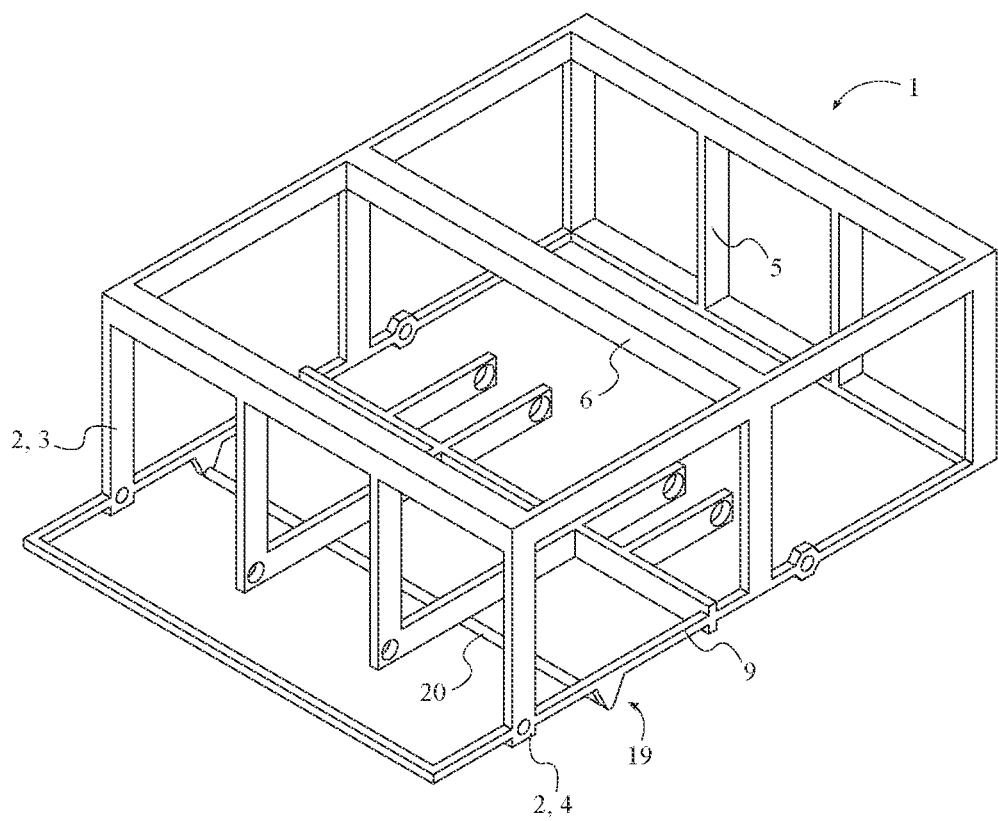
FIG. 13 is a top front perspective view of the support frame of the present invention.
Figure 14:
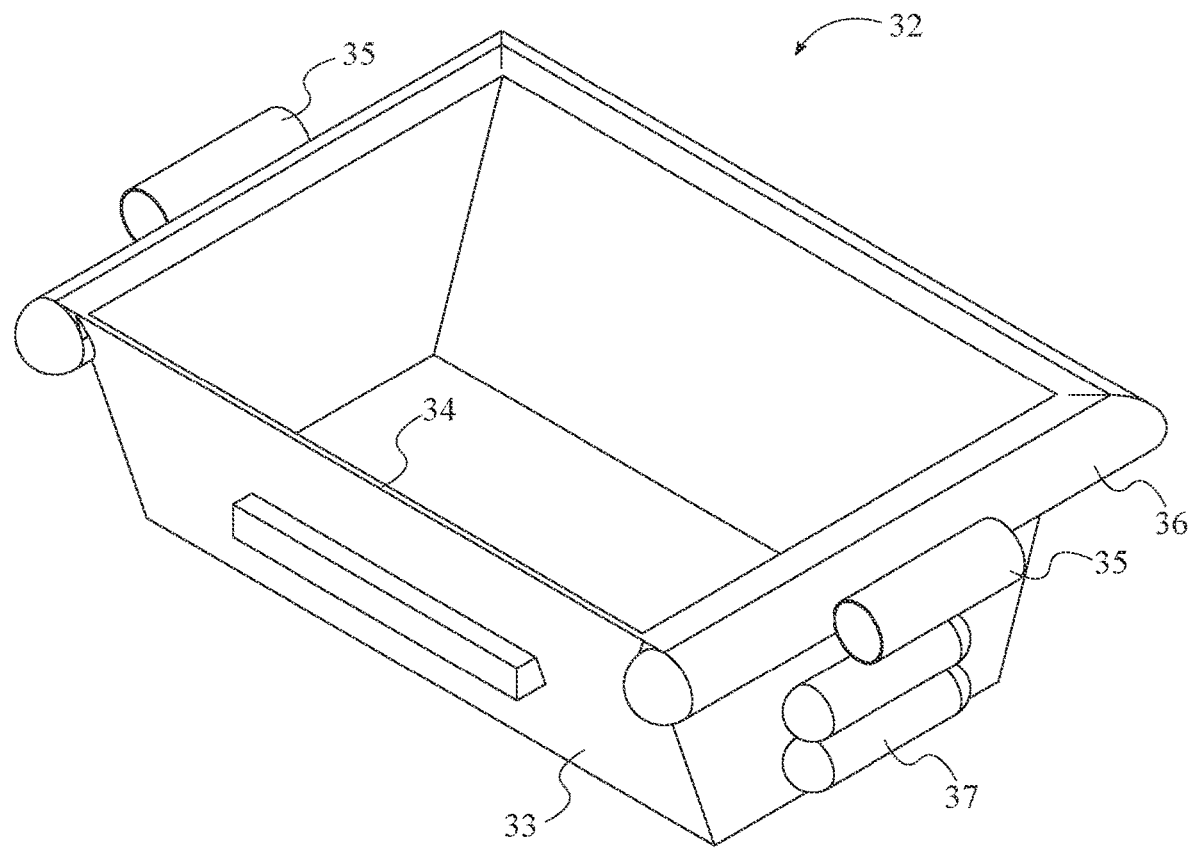
FIG. 14 is a top front perspective view of the collection bin of the present invention.

In some embodiments, the present invention can include several accessories that facilitate the collection and transportation of the polymetallic nodules. For example, as can be seen in FIG. 10, in some embodiments, the present invention may further comprise a rake cover 30 that protects the raking unit 11. The rake cover 30 can include a hollow, hemispherical structure with a size that matches the overall size of the raking unit 11. This way, the rake cover 30 protects the raking unit 11 while enabling the rotation of the plurality of raking disks 16. To do so, the rake cover 30 is positioned offset to the lower base 9 to not obstruct with the movement of the plurality of raking disks 16. Further, the rake cover 30 is positioned adjacent to the raking unit 11 to protect each of the plurality of raking blades 18. The rake cover 30 is also mounted onto the proximal frame section 2 to secure the rake cover 30 to the support frame 1.

As can be seen in FIG. 1 through 10, 16, and 17, in addition to the rake cover 30, the present invention may further comprise a motorized conveyor belt 31 and at least one collection bin 32. The motorized conveyor belt 31 moves the collected polymetallic nodules from the collection ramp 19 to the at least one collection bin 32. The at least one collection bin 32 stores the collected polymetallic nodules until the polymetallic nodules can be moved to the surface. To do so, the motorized conveyor belt 31 being positioned parallel to the proximal frame section 2 to align the motorized conveyor belt 31 with the collection ramp 19. The motorized conveyor belt 31 is also positioned adjacent to the collection ramp 19 so that the collected polymetallic nodules fall onto the motorized conveyor belt 31 after travelling up the collection ramp 19. In addition, the motorized conveyor belt 31 is mounted across the lower base 9 to secure the motorized conveyor belt 31 to the support frame 1. Further, to control the operation of the motorized conveyor belt 31, the motorized conveyor belt 31 is electronically connected to the control unit 26. The motorized conveyor belt 31 is also electrically connected to the control unit 26 to receive the voltage necessary for the operation of the motorized conveyor belt 31. To receive the harvested polymetallic nodules, the at least one collection bin 32 is positioned adjacent to the motorized conveyor belt 31. The at least one collection bin 32 is mounted onto the support frame 1 to secure the at least one collection bin 32 to the support frame 1 during the harvesting process. In other embodiments, the present invention may include several collection bins positioned around the motorized conveyor belt 31 to increase the collection capabilities of polymetallic nodules.

As can be seen in FIG. 1 through 10, 16, and 17, in some embodiments, the present invention can include means to offset the at least one collection bin 32 from the support frame 1 while still enabling the collection of the polymetallic nodules. To do so, the present invention may further comprise at least one motorized extension conveyor belt 40. The at least one motorized extension conveyor belt 40 guides the collected polymetallic nodules from the motorized conveyor belt 31 to the at least one collection bin 32. The at least one motorized extension conveyor belt 40 also elevates the collected polymetallic nodules to an elevated at least one collection bin 32 so that the at least one collection bin 32 can be offset from the ocean floor. The at least one motorized extension conveyor belt 40 comprises a first belt end 41 and a second belt end 42 corresponding to the terminal ends of the at least one motorized extension conveyor belt 40. The first belt end 41 is positioned adjacent to the motorized conveyor belt 31 to guide the collected polymetallic nodules from the motorized conveyor belt 31 to the at least one motorized extension conveyor belt 40. In addition, the first belt end 41 is laterally mounted onto the support frame 1 to secure the at least one motorized extension conveyor belt 40 to the support frame 1. Further, the at least one collection bin 32 is positioned adjacent to the second belt end 42 so that the collected polymetallic nodules moving along the at least one motorized extension conveyor belt 40 fall into the at least one collection bin 32. Further, to control the operation of the at least one motorized extension conveyor belt 40, the at least one motorized extension conveyor belt 40 is electronically connected to the control unit 26. The at least one motorized extension conveyor belt 40 is also electrically connected to the control unit 26 to receive the voltage necessary for the operation of the at least one motorized extension conveyor belt 40. In other embodiments, several motorized extension conveyor belts can be included to accommodate several collection bins positioned around the support frame 1.

In some embodiments, the collection bin may be equipped with integrated means to achieve the necessary buoyancy to lift multiple thousands of pounds. As can be seen in FIG. 1 through 7, 14, and 18, the at least one collection bin 32 may comprise a bin body 33, at least one thruster 35, at least one buoyancy tank 36, at least one air tank 37, a bin controller 38, and a bin power source 39. The bin body 33 is a hollow structure large enough to retain polymetallic nodules. The at least one thruster 35, the at least one buoyancy tank 36, and the at least one air tank 37 enable the maneuvering of the bin body through the target body of water. The bin controller 38 enables the direct or remote control of the at least one collection bin 32. The bin power source 39 provides the voltage necessary for the operation of the electronic and electrical components of the at least one collection bin 32. Further, the bin body 33 comprises a bin rim 34 to the rim formed by an opening of the bin body 33. Accordingly, the at least one buoyancy tank 36 is positioned adjacent to the bin rim 34 to keep the bin body 33 balanced and the collected polymetallic nodules within the bin body 33. The at least one buoyancy tank 36 is laterally mounted onto the bin body 33 to secure the at least one buoyancy tank 36 to the bin body 33. Further, the at least one air tank 37 is laterally mounted onto the bin body 33 to secure the at least one air tank 37 to the bin body 33. The at least one air tank 37 is also in fluid communication with the at least one buoyancy tank 36 to provide the gas necessary to alter the buoyancy of the at least one buoyancy tank 36. Further, the at least one thruster 35 is laterally mounted onto the bin body 33 to secure the at least one thruster 35 to the bin body 33. The bin controller 38 and the bin power source 39 are also mounted onto the bin body 33. The bin controller 38 and the bin power source 39 are hermetically housed to protect the electrical and electronic components. Further, the at least one thruster 35 is electronically connected to the bin controller 38 to control the operation of the at least on thruster. The bin controller 38 can home in on a signal, and then engage the at least on thruster to the present invention for rendezvous, and loading. When loaded, the at least one collection bin 32 can detach from the support frame 1, blow the at least one buoyancy tank 36, home in on the signal from the surface support ship, ascend to the surface, and rendezvous with the surface support ship. Once the at least one collection bin 32 reaches the surface support ship, the at least one collection bin 32 offloads on the surface support ship, the bin power source 39 is recharged, and the at least one air tank 37 is recharged in preparation for next trip to the present invention. The at least one thruster 35 is also electrically connected to the bin controller 38 to receive the voltage necessary for the operation of the at least one thruster 35. In other embodiments, several buoyancy tanks and the necessary air tanks can be provided to increase the load of the bin body 33. Similarly, several thrusters can be provided to maneuver more accurately the at least one collection bin 32.

In other embodiments, an alternative method can be used to bring the full collection bins to the surface to be off-loaded. A large bin with a cable connected to the surface ship can be stationed near the nodule harvester. The smaller collection bins can move between the present invention and the large bin, depositing nodules into the large bin. Once full, the large bin is pulled to the surface by the surface ship and off-loaded. Power may be run from the surface ship by cable to the large bin to provide power to charging ports located on the large bin. The small collection bins can connect to the power port and charge, greatly reducing trips to the surface for charging batteries and replenishing ballast control gases. Most likely configuration includes the support vehicle with a cable from the surface ship to provide power. Having the support vehicle stop mining and resurface to be recharged would be too labor and time consuming. Charging ports could be added to both the support vehicle and to the large bin to take advantage of the surface ship power supply connected to both. In addition to the present invention being able to be mounted to various existing deep-sea vehicles, the present invention can also be integrated into the design of purpose-built vehicles.

Figure 15:
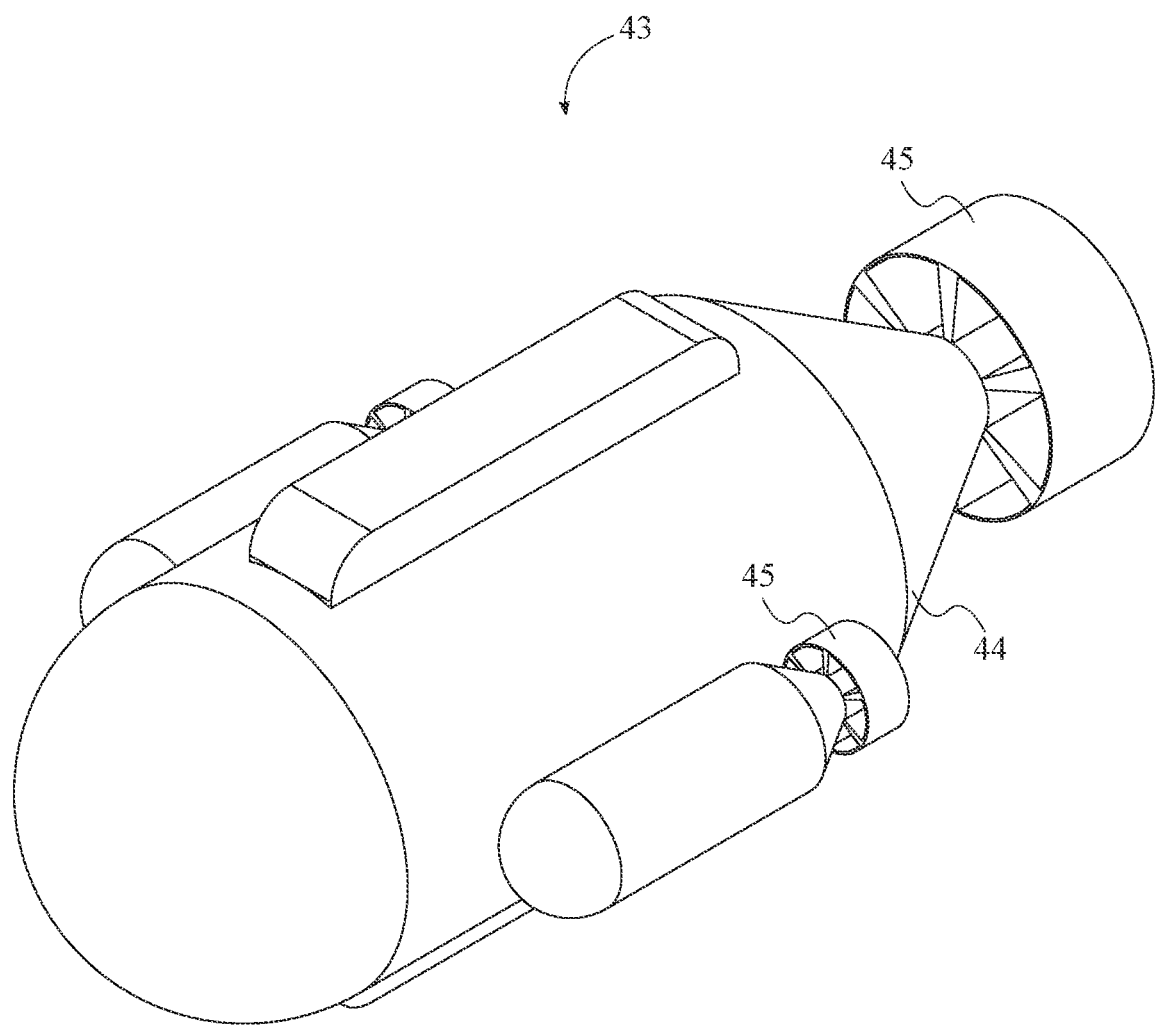
FIG. 15 is a top front perspective view of the support vehicle of the present invention.
Figure 16:
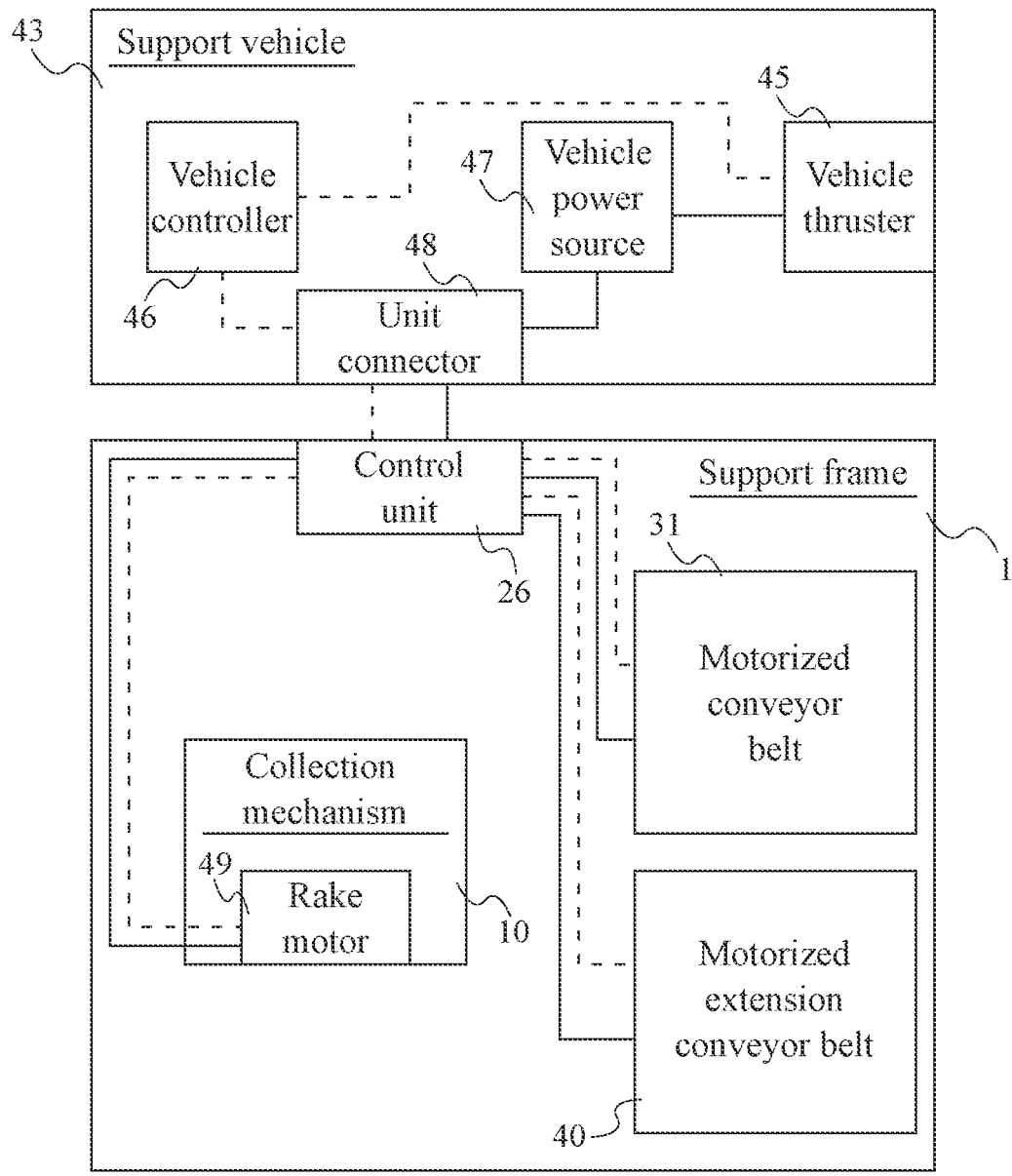
FIG. 16 is a schematic view of the electronic connections and the electrical connections of the present invention, wherein the electronic connections are shown in dashed lines, and wherein the electrical connections are shown in solid lines.
Figure 17:
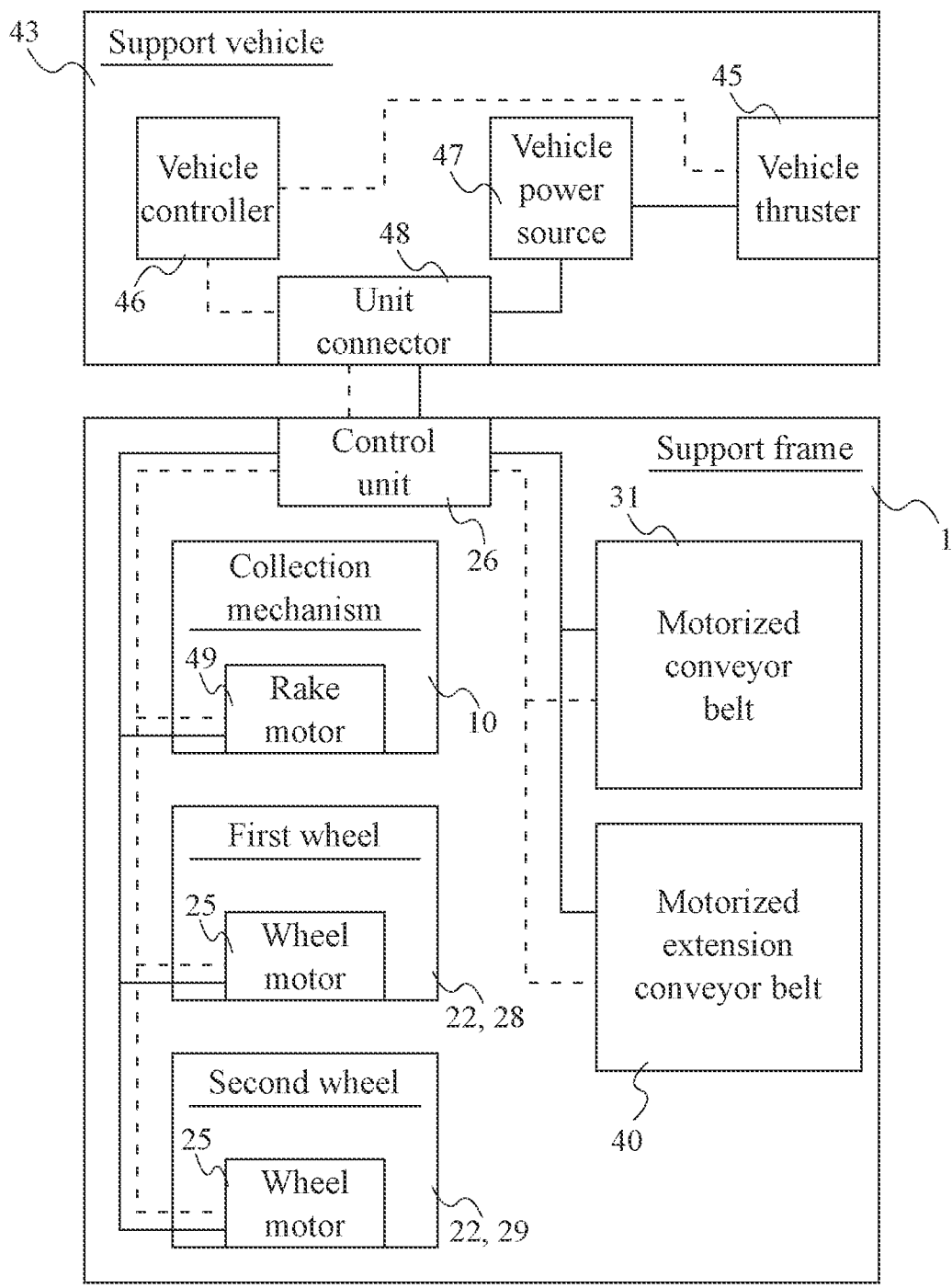
FIG. 17 is a schematic view of the electronic connections and the electrical connections of an alternate embodiment of the present invention, wherein the electronic connections are shown in dashed lines, and wherein the electrical connections are shown in solid lines.
Figure 18:
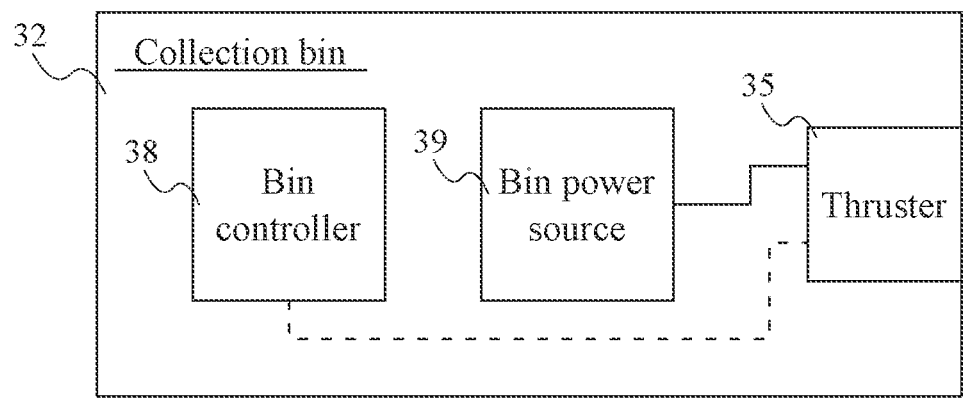
FIG. 18 is a schematic view of the electronic connections and the electrical connections of the collection bin of the present invention, wherein the electronic connections are shown in dashed lines, and wherein the electrical connections are shown in solid lines.

As can be seen in FIG. 15 through 17, in some embodiments, the present invention may further comprise at least one support vehicle 43 to provide buoyancy, directional control, and thrust for the present invention. The at least one support vehicle is preferably a submersible support vehicle of appropriate size that carries the weight of the present invention and the collected nodules in the process of being lifted and deposited into the collection bins located along side of the present invention. An ocean floor rover-type support vehicle could also be used to provide the same function as the submersible support vehicle. The at least one support vehicle 43 provides mobility and power to the present invention. The at least one support vehicle 43 can be connected to a surface support ship via an umbilical that provides power to the at least one support vehicle 43 and the present invention. To do so, the at least one support vehicle 43 comprises a vehicle body 44, at least one vehicle thruster 45, a vehicle controller 46, and a vehicle power source 47. The at least one vehicle thruster 45 enables the maneuvering of the vehicle body 44. The vehicle control and the vehicle power source 47 enable the controlled operation of the at least one support vehicle 43. Accordingly, the at least one vehicle thruster 45 is laterally mounted onto the vehicle body 44 to secure the at least one vehicle thruster 45 to the vehicle body 44. The vehicle controller 46 and the vehicle power source 47 are also mounted within the vehicle body 44 to protect the electronic and electrical components. Further, the at least one vehicle thruster 45 is electronically connected to the vehicle controller 46 to transmit operation signals to the at least one vehicle thruster 45. The at least one vehicle thruster 45 is also electrically connected to the vehicle power source 47 to receive the voltage necessary for operation. The support vehicle may also include additional power storage devices, such as batteries, for emergency operation. The vehicle controller 46 may also include limited logic for emergency recovery as necessary.

As can be seen in FIG. 15 through 17, the at least one support vehicle 43 is designed to support the support frame 1 and connect to the control unit 26 to enable the operation of the present invention. To do so, the at least one support vehicle 43 may further comprise a unit connector 48 that enables the coupling of the at least one support vehicle 43 to the present invention. The unit connector 48 is hermetically integrated into the vehicle body 44 so that the unit connector 48 can be coupled with the control unit 26. Once the at least one support vehicle 43 is positioned adjacent to the support frame 1, the at least one support vehicle 43 can free float adjacent to the support frame 1 so that the at least one support vehicle 43 can receive the mined resources. Further, the unit connector is electronically connected to the control unit 26 to transmit control signals to the electronic components, such as the at least one wheel 22. Furthermore, the unit connector is electrically connected to the control unit 26 to power the electronic and electrical components of the present invention.

Although the invention has been explained in relation to its preferred embodiment, it is to be understood that many other possible modifications and variations can be made without departing from the spirit and scope of the invention.

What is claimed is:

1. A deep-ocean polymetallic nodule collector comprising:
   a rectangular support frame;
   a collection mechanism;
   the support frame comprising a proximal frame section, a distal frame section, an upper base, and a lower base;
   the collection mechanism comprising a raking unit, a collection ramp, at least one wheel, at least one motor, and a control unit;
   the proximal frame section and the distal frame section being positioned parallel and opposite to each other across the support frame; the proximal frame section comprising a plane having a first lateral beam and a second lateral beam;
   the upper base and the lower base being positioned parallel and opposite to each other across the support frame;
   the raking unit being positioned adjacent to the proximal frame section;
   a rake rotation axis of the raking unit being positioned in the plane of the proximal frame section;
   the raking unit being rotationally mounted onto the lower base;
   the collection ramp being positioned adjacent to the raking unit;
   the collection ramp being mounted onto the lower base;
   the at least one wheel being positioned offset to the raking unit;
   the at least one wheel being rotatably mounted onto the lower base;
   the control unit being integrated into the support frame;
   the at least one motor being operatively coupled to the raking unit, wherein the at least one motor is used to rotate the raking unit;
   the at least one motor being electronically connected to the control unit; and
   the at least one motor being electrically connected to the control unit.

2. The deep-ocean polymetallic nodule collector as claimed in claim 1 comprising:
   the raking unit comprising a unit axle and a plurality of raking disks;
   the proximal frame section comprising a first lateral beam and a second lateral beam;
   the unit axle comprising a first axle end and a second axle end;
   the first lateral beam and the second lateral beam being positioned parallel and opposite to each other across the support frame;

the first axle end being rotatably connected to the first lateral beam;
the second axle end being rotatably connected to the second lateral beam;
the plurality of raking disks being distributed along the unit axle; and
the plurality of raking disks being mounted onto the unit axle.

3. The deep-ocean polymetallic nodule collector as claimed in claim 2 comprising:
each of the plurality of raking disks comprising a disk hub and a plurality of raking blades;
the disk hub being axially aligned with the unit axle;
the disk hub being mounted onto the unit axle;
the plurality of raking blades being radially distributed about the disk hub; and
each of the plurality of raking blades being terminally connected to the disk hub.

4. The deep-ocean polymetallic nodule collector as claimed in claim 2 comprising:
the collection ramp comprising a ramp crossbar and a plurality of ramp blades;
the ramp crossbar being positioned parallel and offset to the unit axle;
the ramp crossbar being mounted onto the lower base;
the plurality of ramp blades being distributed along the ramp crossbar;
the plurality of ramp blades being oriented towards the plurality of raking disks; and
each of the plurality of ramp blades being terminally connected to the ramp crossbar.

5. The deep-ocean polymetallic nodule collector as claimed in claim 2 comprising:
a drive assembly;
the at least one motor being positioned adjacent to the proximal frame section;
the at least one motor and the drive assembly being integrated into the lower base; and
the unit axle being torsionally connected to the wheel motor by the drive assembly.

6. The deep-ocean polymetallic nodule collector as claimed in claim 1 comprising:
the at least one wheel comprising a wheel hub and a wheel motor;
the wheel hub and the wheel motor being mounted onto the lower base;
a wheel rotation axis of the wheel hub being positioned parallel to the rake rotation axis;
the wheel hub being torsionally connected to the wheel motor;
the wheel motor being electronically connected to the control unit; and
the wheel motor being electrically connected to the control unit.

7. The deep-ocean polymetallic nodule collector as claimed in claim 1 comprising:
the at least one wheel being a first wheel and a second wheel;
the first wheel and the second wheel being positioned opposite to each other across the support frame; and
the wheel hub of the first wheel being axially aligned with the wheel hub of the second wheel.

8. The deep-ocean polymetallic nodule collector as claimed in claim 1 comprising:
a rake cover;
the rake cover being positioned offset to the lower base;
the rake cover being positioned adjacent to the raking unit; and
the rake cover being mounted onto the proximal frame section.

9. The deep-ocean polymetallic nodule collector as claimed in claim 1 comprising:
a motorized conveyor belt;
at least one collection bin;
the motorized conveyor belt being positioned parallel to the proximal frame section;
the motorized conveyor belt being positioned adjacent to the collection ramp;
the motorized conveyor belt being mounted across the lower base;
the motorized conveyor belt being electronically connected to the control unit;
the motorized conveyor belt being electrically connected to the control unit; and
the at least one collection bin being positioned adjacent to the motorized conveyor belt.

10. The deep-ocean polymetallic nodule collector as claimed in claim 9 comprising:
at least one motorized extension conveyor belt;
the at least one motorized extension conveyor belt comprising a first belt end and a second belt end;
the first belt end being positioned adjacent to the motorized conveyor belt;
the first belt end being laterally mounted onto the support frame;
the at least one collection bin being positioned adjacent to the second belt end;
the at least one motorized extension conveyor belt being electronically connected to the control unit; and
the at least one motorized extension conveyor belt being electrically connected to the control unit.

11. The deep-ocean polymetallic nodule collector as claimed in claim 9 comprising:
the at least one collection bin comprising a bin body, at least one thruster, at least one buoyancy tank, at least one air tank, a bin controller, and a bin power source;
the bin body comprising a bin rim;
the at least one buoyancy tank being positioned adjacent to the bin rim;
the at least one buoyancy tank being laterally mounted onto the bin body;
the at least one air tank being laterally mounted onto the bin body;
the at least one air tank being in fluid communication with the at least one buoyancy tank;
the at least one thruster being laterally mounted onto the bin body;
the bin controller and the bin power source being mounted onto the bin body;
the at least one thruster being electronically connected to the bin controller; and
the at least one thruster being electrically connected to the bin controller.

12. The deep-ocean polymetallic nodule collector as claimed in claim 1 comprising:
at least one support vehicle;
the at least one support vehicle comprising a vehicle body, at least one vehicle thruster, a vehicle controller, and a vehicle power source;
the at least one vehicle thruster being laterally mounted onto the vehicle body;
the vehicle controller and the vehicle power source being mounted within the vehicle body;

the at least one vehicle thruster being electronically connected to the vehicle controller; and the at least one vehicle thruster being electrically connected to the vehicle power source.

13. The deep-ocean polymetallic nodule collector as claimed in claim 12 comprising:

the at least one support vehicle further comprising a unit connector;

the unit connector being hermetically integrated into the vehicle body;

the at least one support vehicle being laterally mounted onto the support frame;

the unit connector being electronically connected to the control unit; and the unit connector being electrically connected to the control unit.

14. A deep-ocean polymetallic nodule collector comprising:

a rectangular support frame;
a collection mechanism;
a drive assembly;

the support frame comprising a proximal frame section, a distal frame section, an upper base, and a lower base;

the collection mechanism comprising a raking unit, a collection ramp, at least one wheel, at least one motor, and a control unit;

the raking unit comprising a unit axle and a plurality of raking disks;

the proximal frame section comprising a first lateral beam and a second lateral beam;

the unit axle comprising a first axle end and a second axle end;

the proximal frame section and the distal frame section being positioned parallel and opposite to each other across the support frame;

the upper base and the lower base being positioned parallel and opposite to each other across the support frame;

the raking unit being positioned adjacent to the proximal frame section;

a rake rotation axis of the raking unit being positioned parallel to the proximal frame section;

the raking unit being rotationally mounted onto the lower base;

the collection ramp being positioned adjacent to the raking unit;

the collection ramp being mounted onto the lower base;

the at least one wheel being positioned offset to the raking unit;

the at least one wheel being rotatably mounted onto the lower base;

the control unit being integrated into the support frame;

the at least one motor being positioned adjacent to the proximal frame section;

the at least one motor and the drive assembly being integrated into the lower base;

the unit axle being torsionally connected to the wheel motor by the drive assembly;

the at least one motor being electronically connected to the control unit;

the at least one motor being electrically connected to the control unit;

the first lateral beam and the second lateral beam being positioned parallel and opposite to each other across the support frame;

the first axle end being rotatably connected to the first lateral beam;

the second axle end being rotatably connected to the second lateral beam;

the plurality of raking disks being distributed along the unit axle; and the plurality of raking disks being mounted onto the unit axle.

15. The deep-ocean polymetallic nodule collector as claimed in claim 14 comprising:

each of the plurality of raking disks comprising a disk hub and a plurality of raking blades;

the collection ramp comprising a ramp crossbar and a plurality of ramp blades;

the disk hub being axially aligned with the unit axle;

the disk hub being mounted onto the unit axle;

the plurality of raking blades being radially distributed about the disk hub;

each of the plurality of raking blades being terminally connected to the disk hub;

the ramp crossbar being positioned parallel and offset to the unit axle;

the ramp crossbar being mounted onto the lower base;

the plurality of ramp blades being distributed along the ramp crossbar;

the plurality of ramp blades being oriented towards the plurality of raking disks; and each of the plurality of ramp blades being terminally connected to the ramp crossbar.

16. The deep-ocean polymetallic nodule collector as claimed in claim 14 comprising:

the at least one wheel comprising a wheel hub and a wheel motor;

the wheel hub and the wheel motor being mounted onto the lower base;

a wheel rotation axis of the wheel hub being positioned parallel to the rake rotation axis;

the wheel hub being torsionally connected to the wheel motor;

the wheel motor being electronically connected to the control unit; and the wheel motor being electrically connected to the control unit.

17. The deep-ocean polymetallic nodule collector as claimed in claim 14 comprising:

a rake cover;

the at least one wheel being a first wheel and a second wheel;

the first wheel and the second wheel being positioned opposite to each other across the support frame;

the wheel hub of the first wheel being axially aligned with the wheel hub of the second wheel;

the rake cover being positioned offset to the lower base;

the rake cover being positioned adjacent to the raking unit; and the rake cover being mounted onto the proximal frame section.

18. The deep-ocean polymetallic nodule collector as claimed in claim 14 comprising:

a motorized conveyor belt;
at least one collection bin;
at least one motorized extension conveyor belt;

the at least one motorized extension conveyor belt comprising a first belt end and a second belt end;

the motorized conveyor belt being positioned parallel to the proximal frame section;

the motorized conveyor belt being positioned adjacent to the collection ramp;

the motorized conveyor belt being mounted across the lower base;

the motorized conveyor belt being electronically connected to the control unit;

the motorized conveyor belt being electrically connected to the control unit;

the at least one collection bin being positioned adjacent to the motorized conveyor belt;

the first belt end being positioned adjacent to the motorized conveyor belt;

the first belt end being laterally mounted onto the support frame;

the at least one collection bin being positioned adjacent to the second belt end;

the at least one motorized extension conveyor belt being electronically connected to the control unit; and the at least one motorized extension conveyor belt being electrically connected to the control unit.

19. The deep-ocean polymetallic nodule collector as claimed in claim 18 comprising:

the at least one collection bin comprising a bin body, at least one thruster, at least one buoyancy tank, at least one air tank, a bin controller, and a bin power source;

the bin body comprising a bin rim;

the at least one buoyancy tank being positioned adjacent to the bin rim;

the at least one buoyancy tank being laterally mounted onto the bin body;

the at least one air tank being laterally mounted onto the bin body;

the at least one air tank being in fluid communication with the at least one buoyancy tank;

the at least one thruster being laterally mounted onto the bin body;

the bin controller and the bin power source being mounted onto the bin body;

the at least one thruster being electronically connected to the bin controller; and the at least one thruster being electrically connected to the bin controller.

20. The deep-ocean polymetallic nodule collector as claimed in claim 14 comprising:

at least one support vehicle;

the at least one support vehicle comprising a vehicle body, at least one vehicle thruster, a vehicle controller, a vehicle power source, and a unit connector;

the at least one vehicle thruster being laterally mounted onto the vehicle body;

the vehicle controller and the vehicle power source being mounted within the vehicle body;

the at least one vehicle thruster being electronically connected to the vehicle controller;

the at least one vehicle thruster being electrically connected to the vehicle power source;

the unit connector being hermetically integrated into the vehicle body;

the at least one support vehicle being laterally mounted onto the support frame;

the unit connector being electronically connected to the control unit; and the unit connector being electrically connected to the control unit.

* * * * *